United States Patent
Claar et al.

(10) Patent No.: US 7,018,321 B2
(45) Date of Patent: Mar. 28, 2006

(54) DEVICE AND METHOD FOR STABILIZING A VEHICLE

(75) Inventors: Klaus-Peter Claar, Gechingen (DE); Martin Lindmayer, Sulz (DE)

(73) Assignee: DaimlerChrysler AG, Stuttgart (DE)

( * ) Notice: Subject to any disclaimer, the term of this patent is extended or adjusted under 35 U.S.C. 154(b) by 61 days.

(21) Appl. No.: 10/809,348

(22) Filed: Mar. 26, 2004

(65) Prior Publication Data

US 2005/0020404 A1    Jan. 27, 2005

(30) Foreign Application Priority Data

Apr. 12, 2003 (DE) .................... 103 16 945

(51) Int. Cl.
*B60W 10/06* (2006.01)
*B60W 10/10* (2006.01)
*B60W 10/18* (2006.01)

(52) U.S. Cl. ..................................... 477/92
(58) Field of Classification Search ............ 477/34, 477/92, 94, 97, 112

See application file for complete search history.

(56) References Cited

U.S. PATENT DOCUMENTS

| 4,467,427 | A | * | 8/1984 | Magnusson | 477/92 |
| 4,491,919 | A | * | 1/1985 | Leiber | 701/81 |
| 4,899,279 | A | * | 2/1990 | Cote et al. | 477/94 |
| 5,322,355 | A | * | 6/1994 | Jonner | 180/197 |

FOREIGN PATENT DOCUMENTS

| DE | 1953499 | | 10/1969 | | |
| DE | 2251548 | | 10/1972 | | |
| DE | 3528389 | A1 | 8/1985 | | |
| DE | 19635809 | A1 | 9/1996 | | |
| DE | 19912332 | A1 | 3/1999 | | |
| JP | 60-184752 | * | 9/1985 | | 180/197 |

\* cited by examiner

*Primary Examiner*—Sherry Estremsky
(74) *Attorney, Agent, or Firm*—Crowell & Moring LLP

(57) ABSTRACT

A method and a device for stabilizing a vehicle having an engine and an automatic transmission for driving drive wheels of a first axle, the transmission having a free-wheeling position for interrupting the force flux between the drive wheels and the engine, and having rotation-sensing wheel sensors on the drive wheels and on wheels of a second axle of the vehicle. The device has gear shift means for shifting the transmission into the free-wheeling position when it is determined, using at least one of the rotation-sensing wheel sensors, that at least one wheel of the second axle is locked or is expected to lock.

19 Claims, 1 Drawing Sheet

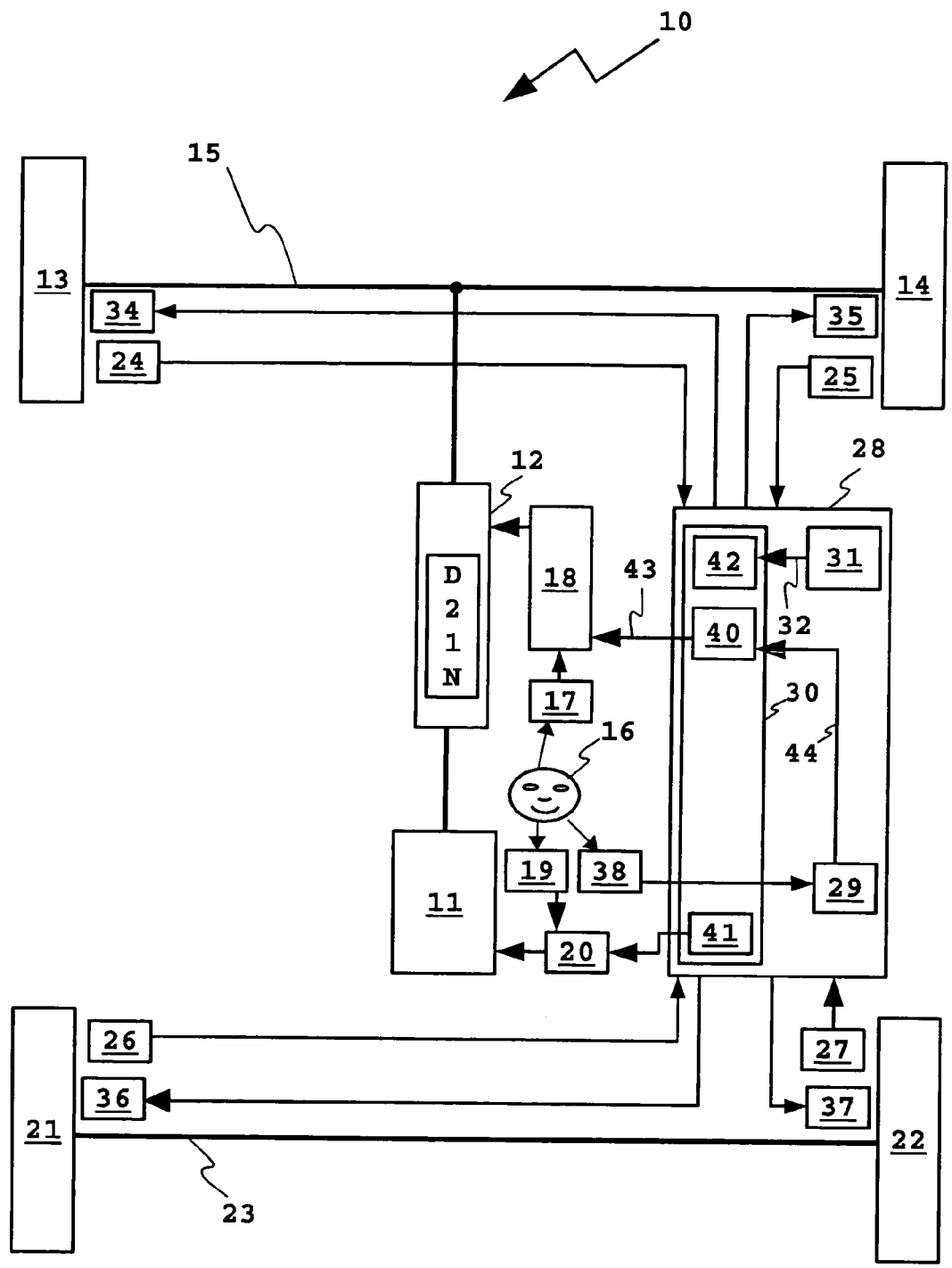

DEVICE AND METHOD FOR STABILIZING A VEHICLE

This application claims the priority of German Patent No. 103 169458, filed Apr. 12, 2003, the disclosure of which is expressly incorporated by reference herein.

BACKGROUND AND DESCRIPTION OF THE INVENTION

The invention relates to a device for stabilizing a vehicle having an engine and an automatic transmission for driving drive wheels of a first axle, the transmission having a free-wheeling position for interrupting the force flux between the drive wheels and the engine, and having rotation-sensing wheel sensors on the drive wheels and on wheels of a second axle of the vehicle. The invention also relates to a method for this purpose.

Such a device or such a method are known, for example, from German Laid-Open Patent Application DE 199 12 332 A1. The device shifts the transmission automatically into the free-wheeling position if a skidding process has been detected using the rotational-speed wheel sensors. Here, a skidding value is determined using the wheel sensors and using a yaw sensor in a way which is not explained in more detail. When a limiting value is exceeded, the transmission is shifted into the freewheeling or neutral position, as a result of which the force flux in the drive train is interrupted. At any rate, the driver no longer needs to shift the transmission himself into the "neutral" position in order to return the vehicle to a stable state.

Other devices from the prior art interact with clutches which mechanically decouple the engine from the drive wheels in drive concepts with manually shifted transmissions. For example, according to German Laid-Open Patent Application DE 35 28 389 A1, there is provision that when a predetermined difference in rotational speed between the driven and non-driven wheels of the vehicle is exceeded, the clutch is disengaged and the clutch is engaged again when said difference drops below this value. This device has the purpose of regulating the drive slip of drive wheels so that it is not necessary to brake the slipping drive wheels. The objective is therefore to bring about the best case of propulsion possible.

An antilock brake regulator according to German Laid-Open Patent Application DT 2 251 548 has a different purpose. This antilock brake regulator automatically disengages the clutch if the vehicle goes into an antilock braking state or skidding state owing to an emergency braking operation, in order to prevent the engine stalling. In this state, the antilock brake regulator is active, that is to say it ensures that the brakes are alternately loaded and relieved of loading so that they do not lock.

The device according to German Laid-Open Patent Application DT 1 953 499 in which, when an antilock brake device is active per se, an antilock brake state of driven rear wheels of a vehicle is sensed, and in this case a vehicle clutch is decoupled in order to prevent the engine stalling, also has a similar objective. Between two antilock braking states, the drive wheels are usually made to rotate again so that the engine does not stall. However, this is not possible when there is too little friction between the ground and drive wheels. In this situation, the device according to DT 1 953 499 ensures that the clutch is disengaged.

In a device in German Laid-Open Patent Application DE 196 35 809 A1, the device according to DE 35 28 389 A1 is developed for the operating case of overrun conditions in which the braking effect of the engine comes into play. If this braking effect becomes too large, a difference in rotational speed between the driven and the non-driven wheels exceeds a limiting value, a friction clutch is disengaged.

However, in a vehicle with an automatic transmission, the locking of the drive wheels can, due to the principle, not lead to the engine stalling. Nevertheless, there is the problem, as in the device according to DE 199 12 332 A1, that the transmission is not shifted, automatically or manually by the driver, into the free-wheeling position until after a skidding situation occurs. The vehicle is then already no longer moving in a stable fashion.

The object of the present invention is therefore to develop a device and a method of the type mentioned at the beginning to the effect that the vehicle is as far as possible prevented from skidding.

This object is achieved with the device by virtue of the fact that it has gear shift means for shifting the transmission into the free-wheeling position when it is determined, using at least one of the rotation-sensing wheel sensors, that at least one wheel of the second axle locks or is expected to lock. Corresponding measures are provided in the method.

A locking situation occurs relatively late at the wheels driven by the engine owing to the driving effect of the engine. In comparison, the wheels of the second axle, which are usually not driven, tend to lock comparatively early. The presence of such locking, or the expectation of locking, is sensed according to the invention. The drive effect of the engine on the drive wheels which prevents locking at said drive wheels is interrupted by the shifting of the transmission into the free-wheeling position so that the vehicle is kept in a state of stable movement or, if appropriate, goes into this state again. The vehicle continues to be steerable. Intervention by the driver, for example by shifting the transmission manually into the free-wheeling or neutral position, is not necessary.

The drive wheels are advantageously still not locked before the shifting into the free-wheeling position owing to the driving effect of the engine.

The device according to the invention expediently actuates the engine, or an engine controller controlling it, in order to decrease the engine power, which brings about a further improvement in the driving stability.

The transmission is advantageously shifted by the device according to the invention into the free-wheeling position only below a predetermined speed. A very low selection can be made for the speed. It is possible, for example, for the vehicle to be just short of complete standstill.

Particularly in this speed range, an antilock brake system of the vehicle is inactive, with the result that it becomes possible for the vehicle to stop completely.

Although this operating state can in theory be determined automatically by the device according to the invention, for example in that the current speed is interrogated by a speed sensor or in that the rotational speed signals of the wheel sensors signal a correspondingly low rotational speed of the wheels. However, the antilock brake system preferably transmits a control signal to the device according to the invention. The antilock brake system signals, as it were, its "inactive state" so that the device according to the invention does not need to determine said state itself.

In the two advantageous refinements of the invention below, the device detects a predetermined braking deceleration of the vehicle on the basis of which it shifts the transmission into the free-wheeling position. The device can determine a deceleration value by reference to speed signals of a speed sensor and/or can determine corresponding reductions in the rotational speed at the wheels of the first and/or the second axle, which are determined by the rotation-sensing wheel sensors.

The transmission is preferably already shifted into the free-wheeling position when one or both wheels of the second axle lock, but this is not yet the case for the wheels of the drive axle.

A difference in rotational speed between in each case at least one wheel of the first axle and one wheel of the second axle is preferably evaluated as a further parameter for shifting the transmission into the free-wheeling position.

The concept according to the invention is expediently applied in a vehicle in which the wheels of the second axle are not driven by the engine. However, in principle it would also be possible for the wheels of the second axle also to be driven. The concept according to the invention can advantageously be applied, for example, even in vehicles in which the engine power is distributed non-uniformly so that, for example, the larger portion of the engine power is applied to the first axle and the smaller portion of the engine power is applied to the second axle. As a result, the wheels of the second axle tend to lock earlier since they have lower engine power.

There is expediently provision for the gear shift apparatus to shift the transmission back into a drive position above a predetermined speed.

The gear shift apparatus advantageously shifts the transmission out of the free-wheeling position and into a drive position after a predetermined time and/or when the wheel of the second axle no longer locks or is no longer expected to lock.

This drive position according to the above-mentioned measures is preferably that position into which the transmission was put before the shifting into the free-wheeling position. However, in principle it would also be possible for the transmission to go into another driving position, for example a lower driving setting corresponding to a lower speed of the vehicle, which is brought about by braking.

The device according to the invention can optionally be embodied using hardware and/or software. It may be a separate device or form a component of an antilock brake system, of a transmission controller or of a driving stability controller. It is also possible that parts of the functions of the device according to the invention are respectively implemented at a plurality of the above-mentioned systems.

The invention is explained below in more detail using an exemplary embodiment and with reference to the figure which shows a vehicle with the device according to the invention, with which the method according to the invention can be executed.

BRIEF DESCRIPTION OF THE INVENTION

FIG. 1 is a schematic illustration of a vehicle stabilization device in accordance with an embodiment of the present invention.

DETAILED DESCRIPTION OF THE INVENTION

A vehicle 10, for example a passenger car, is driven by an engine 11. The engine force of the engine 11 is transmitted to drive wheels 13, 14 of a first drive axle 15 via an automatic transmission 12. A driver 16 can use a selector lever 17 of a transmission controller 18 to predefine into which driving position the automatic transmission 12 is to be set. In the present case this is, in simplified form, a transmission with three driving positions 1, 2 and D. In addition, the transmission 12 can be put into a reverse driving position R (not illustrated) and a free-wheeling or neutral position N, in which the force flux between the engine 11 and the drive wheels 13, 14 is interrupted. In this driving state, the drive wheels 13, 14 can rotate freely. In the driving positions 1, 2, D, the engine 11 is connected to the drive wheels 13, 14 in a frictionally locking fashion. The driver 16 can predefine a power setting to the engine 11 via an accelerator pedal 19 which is connected to an engine controller 20.

Rotation-sensing wheel sensors 24 to 27 are assigned to the drive wheels 13, 14 and to wheels 21, 22 of a second axle 23 (not driven here). The wheel sensors 24 to 27 sense the respective rotational speed of the wheels 13, 14, 21, 22 and signal the corresponding rotational speed values to a driving stability controller 28.

The driving stability controller 28 is here a system with one or more modules whose basic function is known per se, these being, for example, an antilock brake module 29, a movement dynamics module 30 and a speed module 31.

The speed module 31 receives rotational speed values from the wheel sensors 24 to 27 and determines a tachograph signal or speed signal 32 from them. The tachograph signal 32 represents the speed of the vehicle 10 which is displayed, for example, on a dashboard. In addition, the tachograph signal 32 is transmitted to the movement dynamics module 30. The movement dynamics module 30 also receives the respective rotational speed values from the wheel sensors 24 to 27.

The antilock brake module 29 actuates brakes 34 to 37 which are assigned to the wheels 13, 14, 21, 22 and act on them. The antilock brake module 29 prevents the brakes 34 to 37 from locking, in a manner known per se. The driver 16 transmits a braking instruction to a brake pedal 38. In the figure, the antilock brake system of the vehicle 10 is illustrated in a highly simplified and schematic fashion, the pressure on the brake pedal being transmitted, for example, directly to the antilock brake module 29. In practice, the pedal 38 acts, for example, on a hydraulic assembly or the like.

In the exemplary embodiment, the movement dynamics module 30 is configured as a device according to the invention. However, in principle the antilock brake module 29 could also be configured according to the invention. In addition, it would be possible to provide a movement dynamics module that additionally carries out the functions of the antilock brake module 29.

The movement dynamics module 30 keeps the vehicle 10 stable and holds it in a lane which is predefined by the driver 16. To do this it acts on the brakes 34 to 37 and/or the engine controller 20. The module 30 receives measurement variables which are necessary for the movement dynamics control from, for example, the wheel sensors 24 to 27 and from sensors which are not illustrated, for example a yaw sensor or a steering wheel angle sensor.

The movement dynamics module 30 contains input and output interfaces (not illustrated) for, for example, the sensors 24 to 27 and for a vehicle bus, for example a CAN (Controller Area Network) bus, a microprocessor and a volatile and a non-volatile memory. Control programs whose program codes are carried out by the microprocessor are stored in the memory. The function means, for example switching means 40, control means 41 and sensing means 42 according to the invention are also embodied as software here, while an entire or partial embodiment as hardware is also possible. The inventive method of operation of the means 40 to 42 will be explained below in more detail.

For example, the wheel sensors 26 and/or 27 signal to the sensing means 42 that the wheels 21, 22 are no longer rotating, or are now only rotating at a low speed. In contrast, the wheel sensors 24, 25 transmit rotational speed values which are higher than the values signalled by the sensors 26, 27. In other words, the non-driven wheels 21, 22 no longer rotate or only rotate slightly, whereas the drive wheels 13, 14 still rotate, at any rate more quickly than the wheels 21, 22. The engine 11 drives the drive wheels 13, 14. In contrast, either the wheels 21, 22 are already locked or are just about to be, and this is expected by the movement dynamics module 30. In this situation, the movement stability of the vehicle 10 is put at risk. The rear of the vehicle which is driven by the drive axle 15 threatens to veer out.

The driver 16 could then overcome the hazardous situation by shifting the transmission 12 into the free-wheeling position "N" using the selector lever 17. However, this is brought about here by the gear shift means 40 of the movement dynamics module 30. The gear shift means 40 transmit a control signal 43 to the transmission controller 18 which instructs it to shift the transmission into the free-wheeling position "N". As a further measure for stabilizing the vehicle 10, control means 41 instruct the engine controller 20 to reduce the engine power. The function of the control means 41 could alternatively be implemented by correspondingly modified gear shift means 40.

The measures which are described by the means 40, 41 are carried out here by the movement dynamics module 30 only at low speeds of the vehicle 10 which has rear-wheel drive here. At these low speeds, the antilock brake module 29 is inactive. This means that the brakes 34 to 37 are not prevented from locking by the antilock brake module 29 so that the vehicle 10 can come to a complete standstill.

Two methods for determining when the antilock brake module 29 is inactive are implemented in the movement dynamics module 30. One method provides for the antilock brake module 29 to transmit a control signal 44 to the gear shift means 40 when it is inactive. In this operating state, the gear shift means 40 shifts the transmission 12 into the free-wheeling position "N" when the wheels 21, 22 are expected to lock or lock.

In addition, the speed module 31 transmits the tachograph signal 32 to the sensing means 42. When the speed drops below a predetermined speed and when the wheels 21, 22 lock or are expected to lock, the gear shift means 40 then shift the transmission 12 into the free-wheeling position.

When the two wheels 21, 22 no longer lock and the wheels 21, 22 rotate again, the gear shift means 40 shift the transmission 12 back into a driving position 1, 2 or D. In this position, the control signal 43 can instruct the transmission controller 18 quite specifically to select the driving position 1, 2, D which the transmission was put in before shifting into the free-wheeling position "N". However, it is also possible for the transmission controller 18 to independently select a driving position which is suitable for the respective driving state.

Another variant provides that, after a predetermined time period has elapsed, the movement dynamics module 30 instructs the transmission controller 18 to shift the transmission 12 out of the free-wheeling position N and into one of the driving positions 1, 2, D. If the wheels 21, 22 are then expected to lock again, or if locking is already occurring, the movement dynamics module 30 instructs the transmission controller 18 to assume the free-wheeling position "N" again. A shifting cycle of free-wheeling position to driving position can be repeated several times.

One variant of the invention provides for the movement dynamics module to evaluate the respective position of the brake pedal 30. If locking of the wheels 21, 22 of the second axle 23 has already occurred once and the driver 16 activates the brake pedal 38 without interruption so that the vehicle 10 will therefore definitely be braked, the movement dynamics module 30 can instruct the transmission controller 18 to remain in the free-wheeling position N even if the wheels 21, 22 of the second axle 23 no longer lock. As a result, during the entire braking operation, the rear wheels 13, 14 are prevented from "drifting", and the vehicle 10 is kept stable in terms of movement. In addition, the gear shift means 40 can be configured in such a way that they do not instruct the transmission 12 to go into one of the driving positions 1, 2, D again until the tachograph signal 32 signals that a predetermined speed has been exceeded.

Variants of the invention are readily possible. For example, instead of the transmission controller 18, it would be possible to provide a transmission controller which is equipped according to the invention, and the latter could contain, for example, the means 40 to 42.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. Device for stabilizing a vehicle having an engine and an automatic transmission for driving drive wheels of a first axle, the transmission having a free-wheeling position for interrupting the force flux between the drive wheels and the engine, and having rotation-sensing wheel sensors on the drive wheels and on wheels of a second axle of the vehicle, including a gear shift for shifting the transmission into the free-wheeling position when it is determined, using at least one of the rotation-sensing wheel sensors, that at least one wheel of the second axle is locked or is expected to lock, including a speed determiner for determining a speed of the vehicle, wherein the gear shift shifts the transmission into the free-wheeling position below a predetermined speed of the vehicle,
wherein at the predetermined speed, an antilock brake system of the vehicle is inactive.

2. Device according to claim 1, wherein the drive wheels are not locked before the transmission shifts into the free-wheeling position owing to the drive effect of the engine.

3. Device according to claim 1, including a controller for actuating an engine controller of the engine, wherein the controller commands a reduction in an engine power output at least one of before and during the shifting of the transmission into the free-wheeling position.

4. Device according to claim 1, including a braking deceleration sensor which senses a braking deceleration of the vehicle, and the gear shift shifts the transmission into the free-wheeling position as a function of the sensed braking deceleration.

5. Device according to claim 1, wherein the second axle is not driven by the engine.

6. Device according to claim 1, wherein the first axle is the rear axle and the second axle is the front axle of the vehicle.

7. Device for stabilizing a vehicle having an engine and an automatic transmission for driving drive wheels of a first axle, the transmission having a free-wheeling position for interrupting the force flux between the drive wheels and the engine, and having rotation-sensing wheel sensors on the drive wheels and on wheels of a second axle of the vehicle, including a gear shift for shifting the transmission into the free-wheeling position when it is determined, using at least one of the rotation-sensing wheel sensors, that at least one wheel of the second axle is locked or is expected to lock,
   wherein the gear shift shifts the transmission into the free-wheeling position as a function of a control signal of an antilock brake system of the vehicle, and
   wherein the control signal signals the deactivation of the antilock brake system below a predetermined speed of the vehicle.

8. Device for stabilizing a vehicle having an engine and an automatic transmission for driving drive wheels of a first axle, the transmission having a free-wheeling position for interrupting the force flux between the drive wheels and the engine, and having rotation-sensing wheel sensors on the drive wheels and on wheels of a second axle of the vehicle, including a gear shift for shifting the transmission into the free-wheeling position when it is determined, using at least one of the rotation-sensing wheel sensors, that at least one wheel of the second axle is locked or is expected to lock,
   wherein the gear shift shifts the transmission into the free-wheeling position as a function of a reduction in rotational speed of at least one wheel of the second axle when the at least one wheel of the second axle locks.

9. Device according to claim 8, the gear shift shifts the transmission into the free-wheeling position when the at least one wheel of the second axle is locked and at the same time the drive wheels of the first axle are not locked.

10. Device for stabilizing a vehicle having an engine and an automatic transmission for driving drive wheels of a first axle, the transmission having a free-wheeling position for interrupting the force flux between the drive wheels and the engine, and having rotation-sensing wheel sensors on the drive wheels and on wheels of a second axle of the vehicle, including a gear shift for shifting the transmission into the free-wheeling position when it is determined, using at least one of the rotation-sensing wheel sensors, that at least one wheel of the second axle is locked or is expected to lock.
   wherein the gear shift shifts the transmission into the free-wheeling position when there is a difference in rotational speed between at least one drive wheel of the first axle and at least one wheel of the second axle.

11. Device for stabilizing a vehicle having an engine and an automatic transmission for driving drive wheels of a first axle, the transmission having a free-wheeling position for interrupting the force flux between the drive wheels and the engine, and having rotation-sensing wheel sensors on the drive wheels and on wheels of a second axle of the vehicle, including a gear shift for shifting the transmission into the free-wheeling position when it is determined, using at least one of the rotation-sensing wheel sensors, that at least one wheel of the second axle is locked or is expected to lock,
   wherein above a predetermined speed, the gear shift shifts the transmission into a drive position, and
   wherein the gear shift shifts the transmission into the drive position which the transmission had been in before being shifted into the free-wheeling position.

12. Device for stabilizing a vehicle having an engine and an automatic transmission for driving drive wheels of a first axle, the transmission having a free-wheeling position for interrupting the force flux between the drive wheels and the engine, and having rotation-sensing wheel sensors on the drive wheels and on wheels of a second axle of the vehicle, including a gear shift for shifting the transmission into the free-wheeling position when it is determined, using at least one of the rotation-sensing wheel sensors, that at least one wheel of the second axle is locked or is expected to lock,
   wherein the gear shift shifts the transmission out of the free-wheeling position and into a drive position of the transmission after one of a predetermined time period and when the at least one wheel of the second axle no longer locks or is no longer expected to lock,
   wherein the gear shift shifts the transmission into the drive position which the transmission had been in before being shifted into the free-wheeling position.

13. A method for stabilizing a vehicle having an engine and an automatic transmission for driving drive wheels of a first axle, the transmission having a free-wheeling position for interrupting the force flux between the drive wheels and the engine, comprising the acts of:
   sensing rotation of the drive wheels by rotation sensing wheel sensors;
   sensing rotation of wheels of a second axle of the vehicle by rotation sensing wheel sensors;
   determining the speed of the vehicle;
   determining whether at least one wheel of the second axle is locked, or is expected to lock, using at least one of the rotation-sensing wheel sensors; and
   interrupting the force flux between the drive wheels and the engine by shifting the automatic transmission into the free-wheeling position by a gear shift when it is determined that at least one wheel of the second axle is locked or is expected to lock,
   wherein the gear shift shifts the automatic transmission into the free-wheeling position when the vehicle speed is below a predetermined speed of the vehicle, whereas at the predetermined speed an antilock brake system of the vehicle is deactivated.

14. A method for stabilizing a vehicle having an engine and an automatic transmission for driving drive wheels of a first axle, the transmission having a free-wheeling position for interrupting the force flux between the drive wheels and the engine, comprising the acts of:
   sensing rotation of the drive wheels by rotation sensing wheel sensors;
   sensing rotation of wheels of a second axle of the vehicle by rotation sensing wheel sensors;
   determining the speed of the vehicle;
   determining whether at least one wheel of the second axle is locked, or is expected to lock, using at least one of the rotation-sensing wheel sensors; and
   interrupting the force flux between the drive wheels and the engine by shifting the automatic transmission into the free-wheeling position by a geaer shift when it is determined that at least one wheel of the second axle is locked or is expected to lock,
   wherein the gear shift shifts the automatic transmission into its free-wheeling position as a function of a reduction in rotational speed of at least one wheel of the second axle when the at least one wheel of the second axle locks.

15. The method of claim 14, further wherein the gear shift shifts when the at least one wheel of the second axle is locked and at the same time the drive wheels of the first axle are not locked.

16. A method for stabilizing a vehicle having an engine and an automatic transmission for driving drive wheels of a first axle, the transmission having a free-wheeling position for interrupting the force flux between the drive wheels and the engine, comprising the acts of:
   sensing rotation of the drive wheels by rotation sensing wheel sensors;

sensing rotation of wheels of a second axle of the vehicle by rotation sensing wheel sensors;
determining the speed of the vehicle;
determining whether at least one wheel of the second axle is locked, or is expected to lock, using at least one of the rotation-sensing wheel sensors;
interrupting the force flux between the drive wheels and the engine by shifting the automatic transmission into the free-wheeling position by a gear shift when it is determined that at least one wheel of the second axle is locked or is expected to lock; and
shifting the transmission into the free-wheeling position when there is a difference in rotational speed between at least one drive wheel of the first axle and at least one wheel of the second axle.

17. A method for stabilizing a vehicle having an engine and an automatic transmission for driving drive wheels of a first axle, the transmission having a free-wheeling position for interrupting the force flux between the drive wheels and the engine, comprising the acts of:
sensing rotation of the drive wheels by rotation sensing wheel sensors;
sensing rotation of wheels of a second axle of the vehicle by rotation sensing wheel sensors;
determining the speed of the vehicle;
determining whether at least one wheel of the second axle is locked, or is expected to lock, using at least one of the rotation-sensing wheel sensors;
interrupting the force flux between the drive wheels and the engine by shifting the automatic transmission into the free-wheeling position by a gear shift when it is determined that at least one wheel of the second axle is locked or is expected to lock; and
shifting the transmission when the vehicle is above a predetermined speed into a drive position which the transmission had been in before being shifted into the free-wheeling position.

18. A method for stabilizing a vehicle having an engine and an automatic transmission for driving drive wheels of a first axle, the transmission having a free-wheeling position for interrupting the force flux between the drive wheels and the engine, comprising the acts of:
sensing rotation of the drive wheels by rotation sensing wheel sensors;
sensing rotation of wheels of a second axle of the vehicle by rotation sensing wheel sensors;
determining the speed of the vehicle;
determining whether at least one wheel of the second axle is locked, or is expected to lock, using at least one of the rotation-sensing wheel sensors;
interrupting the force flux between the drive wheels and the engine by shifting the automatic transmission into the free-wheeling position by a gear shift when it is determined that at least one wheel of the second axle is locked or is expected to lock; and
shifting the transmission out of the free-wheeling position and into a drive position after one of a predetermined time period and when the at least one wheel of the second axle no longer locks or is no longer expected to lock, wherein the transmission had been in the drive position before being shifted into the free-wheeling position.

19. A method for stabilizing a vehicle having an engine and an automatic transmission for driving drive wheels of a first axle, the transmission having a free-wheeling position for interrupting the force flux between the drive wheels and the engine, comprising the acts of:
sensing rotation of the drive wheels by rotation sensing wheel sensors;
sensing rotation of wheels of a second axle of the vehicle by rotation sensing wheel sensors;
determining the speed of the vehicle;
determining whether at least one wheel of the second axle is locked, or is expected to lock, using at least one of the rotation-sensing wheel sensors; and
interrupting the force flux between the drive wheels and the engine by shifting the automatic transmission into the free-wheeling position by a gear shift when it is determined that at least one wheel of the second axle is locked or is expected to lock;
shifting the transmission into the free-wheeling position as a function of a control signal of an antilock brake system of the vehicle; and
signaling with the control signal the deactivation of the antilock brake system below a predetermined speed of the vehicle.

* * * * *